Oct. 10, 1967 H. J. DEVON 3,345,749
ROTARY DIE LAYOUT MACHINE
Filed Aug. 13, 1965 2 Sheets-Sheet 1

INVENTOR
HARRY J. DEVON
BY
Christy, Parmelee &
Strickland
his ATTORNEYS

Oct. 10, 1967  H. J. DEVON  3,345,749
ROTARY DIE LAYOUT MACHINE
Filed Aug. 13, 1965  2 Sheets-Sheet 2

INVENTOR.
HARRY J. DEVON
BY
Christy, Parmelee &
Strickland
his ATTORNEYS

United States Patent Office 3,345,749
Patented Oct. 10, 1967

3,345,749
ROTARY DIE LAYOUT MACHINE
Harry J. Devon, Pittsburgh, Pa., assignor to Jas. H. Matthews & Co., Pittsburgh, Pa., a corporation of Pennsylvania
Filed Aug. 13, 1965, Ser. No. 479,559
7 Claims. (Cl. 33—22)

ABSTRACT OF THE DISCLOSURE

A rotary die layout machine is disclosed having a table adapted to receive a pattern to be traced onto a cylinder rotatably supported by the table. A tracing stylus is provided which is connected to a marking stylus bearing on the surface of the cylinder in such a manner that it moves exactly as the tracing stylus moves in tracing lines parallel with the axis of the cylinder, but when the tracing stylus moves toward or away from the cylinder, either straight, diagonally or on a curve, corresponding to a peripheral marking to appear on the cylinder, the cylinder is caused to rotate through an arc by means of a drive operatively connected to the tracing stylus such that the length of the arc is different from but proportionate to the distance which the tracing stylus is moved toward or away from the cylinder.

---

This invention relates to an apparatus for use in the preparation of rotary dies and to similar operations where a pattern or outline originally prepared on a plane is transferred to a cylinder, and a die is then constructed on the cylinder with operative portions extending above or below the surface of the cylinder and hence moving a peripheral length of travel different from the surface of the cylinder on which the pattern was traced.

The invention has particular application to the construction of rotary box-blank cutting dies and will be particularly described in connection with such dies, but this is by way of illustration and does not exclude other operations to which the apparatus is also applicable.

Sheets of boxboard for the manufacture of boxes and cartons have been cut into blanks by the use of dies formed on flat plates that are reciprocated vertically in a press. More recently production has been increased by the use of rotary dies where the sheet of boxboard moves between upper and lower cylindrical rolls. One of these rolls has a cutting strip projecting from its periphery outlining the pattern to be cut, and the other roll is a cushioned back-up roll against which the cutting or die roll works.

The cutting dies themselves are commonly made from arcuately-curved segments of plywood secured to the surface of the die cylinder. A pattern is traced on the surface of the plywood and then a kerf or kerfs are cut in the plywood, these kerfs following the outline traced on the surface of the segments. Specially formed metal strips are inserted edgewise in the kerfs so formed, these strips being secured in the kerfs and projecting beyond the surface of the plywood from somewhere around a quarter of an inch to somewhere around seven-sixteenths or a half inch. In other words, the cutting edge of the die is from a quarter to a half inch further from the axis of rotation of the cylinder than is the surface of the plywood on which the pattern is traced, and as a result its peripheral length is increased while its length in an axial direction is not changed. Because of this, the common procedure in transferring some patterns to rolls in certain arts of putting the pattern on flat paper, wrapping the paper about the cylinder and tracing the pattern directly onto the surface of the cylinder cannot be followed, and considerable care must be taken to foreshorten all of those lines of the pattern in laying it out on the cylinder which have a peripheral or peripheral component of direction to compensate for the dimensional changes resulting from this discrepancy between the radius of the roll and the radius of the die subsequently constructed thereon and extending above the surface. The die makers accordingly use stretch rules to take care of this, but this is slow and easily results in error.

The present invention provides a machine which will automatically shorten all peripherally-extending lines on the cylinder when the operator follows the outline of a flat pattern which is the dimensional counterpart of the die to be formed by movement of a tracing stylus over the pattern. This stylus is connected to a marking stylus bearing on the surface of the cylinder so that it moves exactly as the tracing stylus moves in tracing lines parallel with the axis of the cylinder, but when the tracing stylus moves toward or away from the cylinder, either straight, diagonally or on a curve, corresponding to a peripheral marking to appear on the cylinder, the cylinder is rotated through a drive that turns the roll under the marking stylus at the same speed and distance that the cutting edge to be ultimately placed on the cylinder moves, and since the marking stylus is against the surface of the cylinder, it will trace a line which is shorter in peripheral extent than the movement of the tracing stylus by the same amount that the circumference of the surface of the cylinder is less than the circumference of a circle described by the cutting edge which will be applied to and project from the surface of the cylinder.

The invention has for its object to provide a new and unique machine for translating a planar pattern to a cylindrical surface and compensate for such change of dimension that may be required because of a change in radius that may take place by reason of the circumference of the cylinder being less or different from the circumference of elements to be applied to and project above said surface and therefore move in a wide circle of greater or different diameter than the surface of the cylinder.

These and other objects and advantages are secured by the invention as will become more fully apparent from the following detailed description in conjunction with the accompanying drawings, in which.

Figure 1:
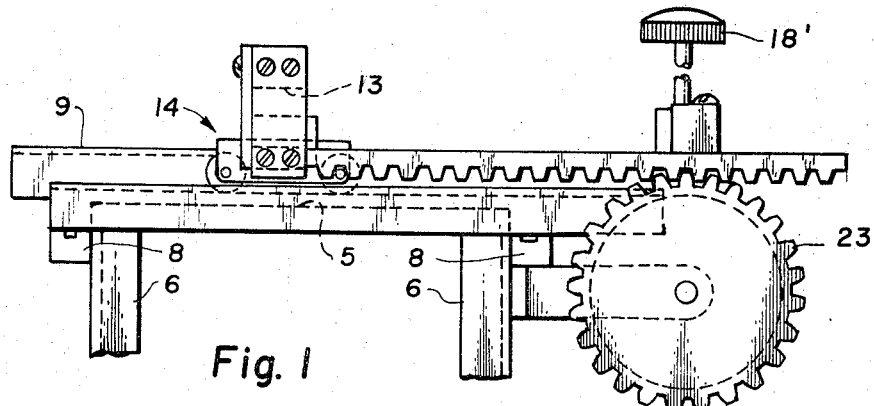
FIG. 1 is a side elevation of a machine embodying my invention, certain portions being exaggerated.
Figure 2:
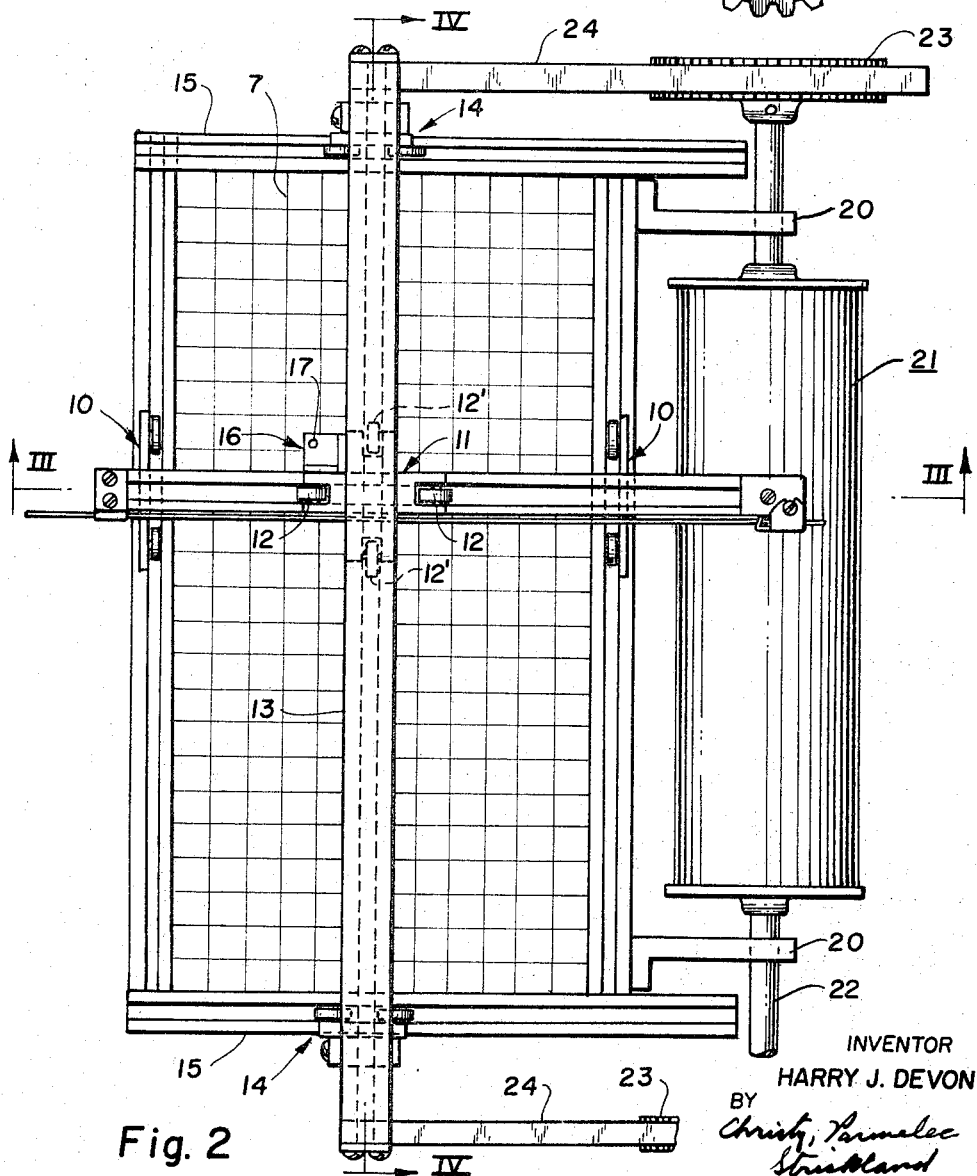
FIG. 2 is a plan view of the apparatus shown in FIG. 1.
Figure 3:
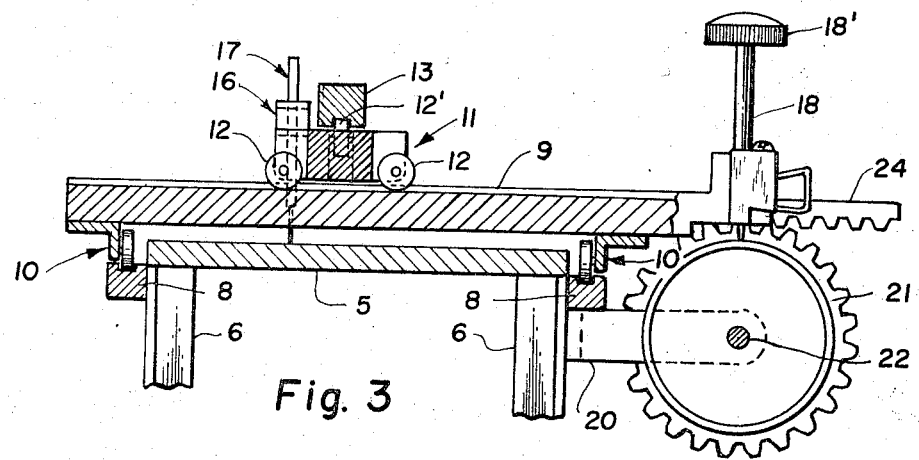
FIG. 3 is a vertical longitudinal section through the machine in substantially the plane of line III—III of FIG. 2.
Figure 4:
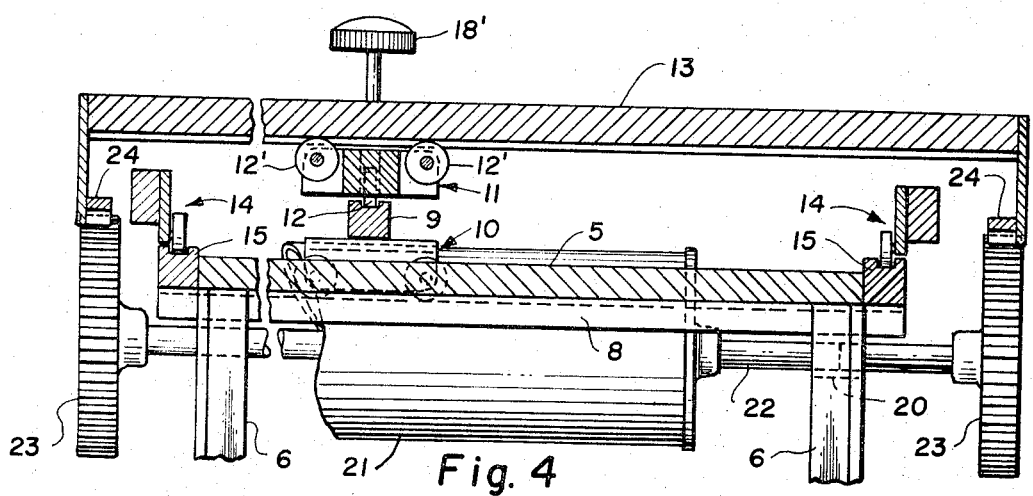
FIG. 4 is a transverse vertical section in the plane of line IV—IV of FIG. 2.
Figure 6:
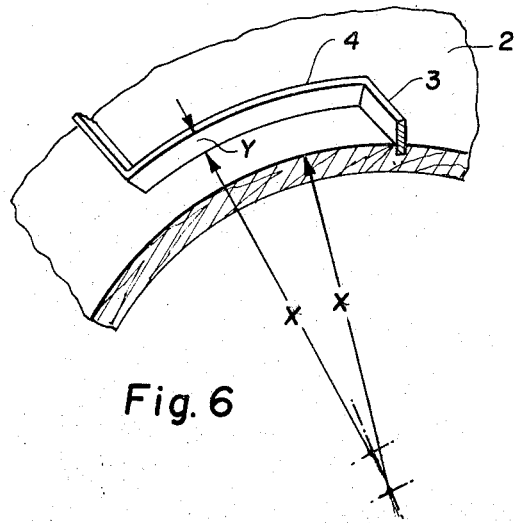
FIG. 6 is a schematic perspective view of a fragment of a die showing the manner of constructing the die and the difference in diameter between the original cylinder and the periphery of the finished die.
Figure 5:
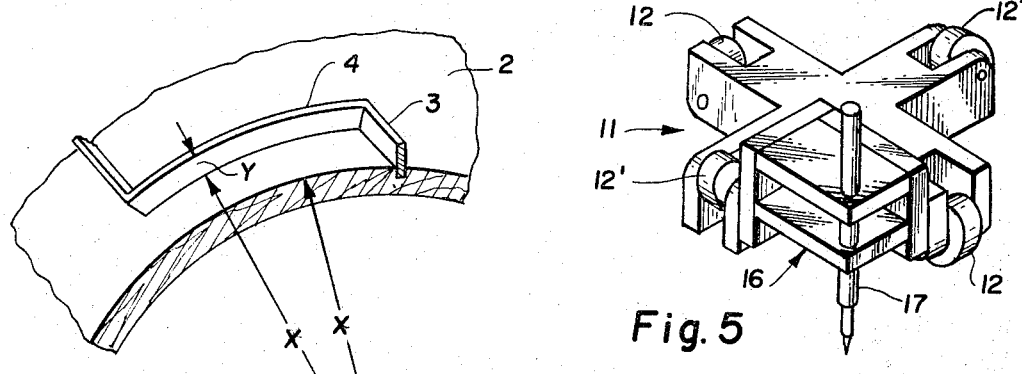
FIG. 5 is a perspective view of the tracing stylus carriage with the cross bar removed.

Referring first to FIG. 6, there is shown a fragment of a plywood section 2 designed to be applied to the surface of the cutter roll of a rotary box die machine. It has a radius $x$ from the center of curvature or axis of the cutter roll to the peripheral surface of the segment. A portion of a cutter strip is secured in the usual way in a kerf in the segment. The kerf is normally cut through the segment with connecting bridges, which are left at intervals, similar to the connecting portions in stencils. The structure of the die and the manner of cutting it is known in the art, and need not be further explained here. As here shown a portion of the cutter strip, marked 3, is parallel wth the axis of the cylinder and portion 4 extends in a peripheral direction. Other parts, not shown, may be curves or be diagonal. It will be seen that the radius from the axis of the cylinder to its surface is $x$ and the radius to the cutting edge $x+y$. In actual machines $x$ might be of the order of around 10 inches, a typical drum being round 66 inches in circumference, and $y$ would be a distance between a quarter and a half inch greater. Therefore portion 4 is longer at its free edge than it is at the surface of the plywood cylinder. Portion 3, however, is the same length along both the edge and the surface of the cylinder.

The machine of the present invention is typically for tracing the pattern for the kerf to be cut in the plywood cylinder. It comprises a table 5 mounted on a supporting structure 6, the top of the table being a plane. It has a ruled chart 7 or cross lines in the surface dividing it into squares. At the front and rear edges of the table are rails 8. There is a rigid strip 9 spaced above the table, each of its ends being supported on a trolley or roller carriage 10 that move along and are guided guided by the rails, providing a movable bridge. With this arrangement the bridge may be moved over the table from side to side.

The bridge has a longitudinal groove in the top and there is a carriage 11 with rollers 12 projecting below the bottom of the carriage which are guided in this groove so that the carriage may be moved in a fore-and-aft direction along the bridge at right angles to the direction on which the bridge as a whole travels.

There is a cross bar 13 extending over the table at right angles to the bridge the full width of the table, and which has a groove extending lengthwise of its under surface. Rollers 12' projecting above the top of the carriage 11 are received in and guided in this groove. The cross bar has roller supports 14 at each end that ride on tracks or grooved runways 15 along each side edge of the table. As the carriage 11 is moved fore-and-aft on the bridge, the cross bar moves with it. As the bridge moves from side to side, the carriage is guided by its rollers 12' in the grooves along the cross bar. The carriage has transparent plastic brackets 16 thereon that support a vertical tracing stylus 17 that terminates just above the table top. At the forward end of the bridge 9 which projects beyond the table there is a marking stylus 18.

There are bearing brackets 20 positioned forwardly of the table and below it and the cylindrical roll with the surface to be marked, designated 21, is carried on a shaft 22 passing through these bearings. The axis of the shaft is parallel with the forward edge of the table and with the markings that extend across the table. There is a gear wheel 23 keyed to each end of the shaft 22, the pitch diameter of which is different from the diameter of the roll by an amount equal to the distance the die edges are removed from the surface of the drum. In the making of box dies, the pitch diameter of the gear wheels will be the diameter of the circle described by the cutting edges of the strips to be mounted on the cylinder. Stated differently, the surface of the cylinder has a diameter $x$ in FIG. 6 while the pitch diameter of the gear wheels 12 is $x+y$. This difference is very greatly exaggerated in the drawings for clarity of illustration, and which are intended to show the principle rather than accurate dimension.

The marking stylus 18 rests on the surface of the cylinder directly over the axis of rotation of the cylinder so that it is exactly radial to the surface of the cylinder.

Attached to each end of the cross bar is a toothed rack 24 and each one of these engages the gear wheel 23 on the side of the machine on which it is located. It will be seen that this arrangement constitutes a drive for rotating the roll 21 when the carriage 11 with its tracing stylus approaches or recedes from the roll, but when the carriage moves only parallel with the axis of the roll by movement of the bridge 10, the roll is not rotated. If the tracing stylus moves along a path which is a component of both directions, the roll will be rotated. With the gear wheels having a pitch diameter greater than the diameter of the cylinder and the marking stylus being on the cylinder, markings made when the cylinder rotates will be foreshortened, but markings in the direction of the axis of the cylinder will be equal to the full sidewise travel of the tracing stylus.

The arrangement differs from a pantograph in two respects. There is no movement of the marking stylus in the direction of the periphery of the roll, the stylus always remaining at some point on a line along the length of the cylinder, and there is no system of pivoted linkages anchored at a fixed point, as is necessary to a pantograph system.

In operation, a pattern is placed flat on the table which outlines the blank or pattern to be cut by the die to be formed on the cylinder, this pattern being a counterpart in all dimensions of the blank to be cut, except that the bridging areas for holding the parts of the die together will be indicated on it. The ruled area of the table is exactly the length of the cylinder to be marked upon, and half the circumference of the finished die to be made on the roll. With this arrangement the operator can locate the pattern on the table in such manner as to correspondingly exactly locate the marking on the roll. This is important, since multiple dies may be formed on one roll and all of the dies must be positioned to clear one another but for economy be positioned to keep scrap to a minimum.

The pattern is temporarily secured to the table by thumbtacks, staples, or any other suitable fastening. The operator moves the tracing stylus to a position over a starting point and then moves the stylus to follow the outline of the pattern, or it may be moved automatically by pattern tracing devices available for the guidance of a stylus over or around a pattern. In so doing the carriage, by reason of the rollers being received in the grooves of the bridge and cross strip with no side play, moves the bridge sideways and the cross strip toward and away from the cylinder, the latter movement rotating the cylinder as above explained through an arc shorter than the rotational movement of the gear wheel. Where the continuity of a line is to be broken, the operator may raise the marking stylus end of the bridge clear of the roll by lifting up on knob 18' on the top of the stylus.

While I have shown and described one embodiment of my invention, it will of course be apparent that the rotational movement of the cylinder may be effected through sprocket chain type gearing or non-slip belt type gearing, so long as the rotational movement of the cylinder under the stylus is different from the linear travel of the shaft turning gear by a distance corresponding to the predetermined change in the length of arc of the original surface of the cylinder and the die to be provided on such surface. Ordinarily, with box dies, the circumference of the die will be greater than the circumference of the cylinder. However, with some layout work it may be desirable to mark the lines on the cylinder where the length of the lines in a peripheral direction of the cylinder are increased over the actual distance, in which case the gear would be of lesser diameter than the cylinder. Such might be the case in securing dimensions for a die to be formed on the concave surface of a supporting plate. Various other changes and modifications may be made in the construction and within the contemplation of the invention, as will be apparent to those skilled in the art.

I claim:
1. Layout apparatus of the class described comprising:
  (a) a table adapted to receive a flat pattern to be traced,
  (b) a cylinder rotatably supported at the front of the table on which the pattern is to be reproduced,
  (c) a bridge extending over the table and movable from side to side in a direction parallel with the axis of the cylinder,
  (d) a marking stylus on the end of said bridge bearing on the surface of the cylinder in a direction radial to the axis of the cylinder and arranged to trace a line on the cylinder, (e) a cross bar extending over the table parallel with the axis of the cylinder and crossing the bridge at right angles, the cross bar being movable in a direction toward and away from the cylinder, (f) a carriage at the intersection of the cross bar and bridge and movable along each but engaged with each in such manner that movement of the carriage along the bridge toward and away from the roll effects a corresponding movement of the cross bar and movement of the carriage along the cross bar effects a sidewise travel of the bridge to thereby move the marking stylus along the surface of the cylinder in the direction of its length, (g) a tracing stylus fixed on the carriage for following the contour of a pattern on the table, (h) and a driving connection between the cross bar and the cylinder for rotating the cylinder upon movement of the cross bar, said driving means including a wheel fixed to rotate with the cylinder of an effective diameter different from the diameter of the cylinder through which said driving means is effective whereby the mark made by the marking stylus on the rotating cylinder is of a length different from the length of the arc through which the wheel is rotated.

2. Layout apparatus of the class described comprising:

(a) a table adapted to receive a flat pattern to be traced, (b) a cylinder rotatably supported at the front of the table on which the pattern is to be reproduced, (c) a bridge extending over the table and movable from side to side in a direction parallel with the axis of the cylinder, (d) a marking stylus on the end of said bridge bearing on the surface of the cylinder in a direction radial to the axis of the cylinder and arranged to trace a line on the cylinder, (e) a cross bar extending over the table parallel with the axis of the cylinder and crossing the bridge at right angles, the cross bar being movable in a direction toward and away from the cylinder, (f) a carriage at the intersection of the cross bar and bridge and movable along each but engaged with each in such manner that movement of the carriage along the bridge toward and away from the cylinder effects a corresponding movement of the cross bar and movement of the carriage along the cross bar effects a sidewise travel of the bridge to thereby move the marking stylus along the surface of the cylinder in the direction of its length, (g) a tracing stylus fixed on the carriage for following the contour of a pattern on the table, (h) and a driving connection between the cross bar and the cylinder for rotating the cylinder upon movement of the cross bar, said driving means including a wheel fixed to rotate with the cylinder of an effective diameter greater than the diameter of the cylinder through which said driving means is effective whereby the mark made by the marking stylus on the rotating cylinder is of a length shorter than the length of the arc through which the wheel is rotated.

3. Layout apparatus as defined in claim 2 wherein said wheel is a gear wheel having a pitch diameter which is greater than the diameter of the cylinder and the driving connection is a toothed rack connected to the cross bar and operatively engaged with the gear wheel.

4. Layout apparatus as defined in claim 3 wherein the cylinder has a shaft and a gear wheel is fixed to each end of the shaft and there is a rack at each end of the cross bar, one engaging each gear wheel to keep the cross bar parallel with the cylinder shaft.

5. Layout apparatus as defined in claim 2 in which the table has a cross-ruled area on which a pattern is placed, the area being of a length in a direction toward and away from the cylinder equal to at least half the effective circumference of said wheel, the table having a width from side to side equal to the length of the cylinder.

6. A layout machine as defined in claim 2 in which the carriage has a transparent support for the tracing stylus whereby the pattern on the table is visible through the support.

7. A layout apparatus as defined in claim 2 in which the bridge has a groove extending lengthwise thereof and the carriage has roller means on the lower face thereof confined in said groove against sidewise travel, but which may roll in the groove, and wherein the cross bar has a groove along its underside and the carriage has roller means on the top surface thereof confined against sidewise movement in the last-named groove but which roll in said groove.

References Cited

UNITED STATES PATENTS

| 281,509 | 7/1883 | Hope | 33—22 |
| 301,066 | 6/1884 | Mowat | 33—22 |
| 486,210 | 11/1892 | Hope | 33—22 |
| 2,977,681 | 4/1961 | Cadman et al. | 33—21 |

FOREIGN PATENTS

| 92,716 | 7/1897 | Germany. |

LEONARD FORMAN, *Primary Examiner.*

H. N. HAROIAN, *Assistant Examiner.*